(12) United States Patent
Lei et al.

(10) Patent No.: US 8,252,200 B2
(45) Date of Patent: Aug. 28, 2012

(54) COATED CALCIUM HYPOCHLORITE COMPOSITION

(75) Inventors: Deqing Lei, Hamden, CT (US); George Polson, Springboro, OH (US); Sonia Oberson, Shelton, CT (US); Ellen M. Meyer, Cleveland, TN (US); James D. Kilby, Cleveland, TN (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 11/602,816

(22) Filed: Nov. 21, 2006

(65) Prior Publication Data

US 2007/0125979 A1    Jun. 7, 2007

Related U.S. Application Data

(60) Provisional application No. 60/741,503, filed on Dec. 1, 2005.

(51) Int. Cl.
*C01B 11/06* (2006.01)
*C11D 3/395* (2006.01)

(52) U.S. Cl. ........... 252/187.3; 252/187.27; 252/187.28; 252/186.25; 252/186.27

(58) Field of Classification Search ................ 252/187.3
See application file for complete search history.

(56) References Cited

U.S. PATENT DOCUMENTS

| | | | |
|---|---|---|---|
| 3,297,413 A * | 1/1967 | Bennett | ............................ 23/301 |
| 3,440,024 A | 4/1969 | Faust et al. | |
| 3,544,267 A | 12/1970 | Dychdala | |
| 3,668,134 A | 6/1972 | Lamberti et al. | |
| 3,669,891 A | 6/1972 | Greenwood et al. | |
| 3,669,894 A | 6/1972 | Faust | |
| 3,760,064 A | 9/1973 | Droste | |
| 3,793,216 A * | 2/1974 | Dychdala et al. | ........ 252/186.37 |
| 3,821,117 A | 6/1974 | Breece et al. | |
| 3,953,354 A | 4/1976 | Faust | |
| 3,969,546 A * | 7/1976 | Saeman | ........................ 427/213 |
| 4,005,028 A | 1/1977 | Heckert et al. | |
| 4,035,484 A | 7/1977 | Faust et al. | |
| 4,048,351 A | 9/1977 | Saeman et al. | |
| 4,051,056 A | 9/1977 | Hartman | |
| 4,071,605 A | 1/1978 | Wojtowicz | |
| 4,087,360 A * | 5/1978 | Faust et al. | .................... 210/701 |
| 4,108,792 A * | 8/1978 | Farmer et al. | ............ 252/187.29 |
| 4,118,524 A * | 10/1978 | Saeman | ........................ 427/213 |
| 4,145,306 A | 3/1979 | Tatara et al. | |
| 4,146,676 A * | 3/1979 | Saeman et al. | ................ 428/403 |
| 4,174,411 A * | 11/1979 | Saeman et al. | ................ 427/214 |
| 4,192,763 A | 3/1980 | Buchnan | |
| 4,201,756 A * | 5/1980 | Saeman et al. | ................ 423/266 |
| 4,208,344 A | 6/1980 | Dingwall et al. | |

(Continued)

FOREIGN PATENT DOCUMENTS

EP     1 464 617 A1    10/2004

(Continued)

*Primary Examiner* — Joseph D Anthony
(74) *Attorney, Agent, or Firm* — Lucas & Mercanti, LLP

(57) ABSTRACT

The present invention is directed to a water treatment composition, comprising: calcium hypochlorite coated with a coating comprising at least one hydrated or anhydrous salt. The present invention is also directed to a water treatment composition, comprising: (a) an inner core layer comprising calcium hypochlorite; (b) one or more interlayers of selected salts positioned on top of said inner core layer, and (c) one or more outer layers of selected salts positioned on top of said interlayer(s).

36 Claims, 3 Drawing Sheets

A multilayer coated calcium hypochlorite

Outer layers: hydrate, stable hydrate of salt, active ingredient

Inter layer: anhydrous salt, base and stable hydrate

Core layer: hydrated and anhydrous calcium hypochlorite

U.S. PATENT DOCUMENTS

| | | | |
|---|---|---|---|
| 4,216,027 A | 8/1980 | Wages | |
| 4,248,848 A * | 2/1981 | Murakami et al. | 423/474 |
| 4,276,349 A | 6/1981 | Saeman | |
| 4,289,640 A | 9/1981 | Falivene | |
| 4,355,014 A | 10/1982 | Murakami et al. | |
| 4,380,533 A | 4/1983 | Wojtowicz | |
| 4,539,179 A | 9/1985 | Meloy | |
| 4,615,794 A | 10/1986 | Belanger | |
| 4,668,475 A | 5/1987 | Meloy | |
| 4,692,335 A | 9/1987 | Iwanski | |
| 4,780,216 A | 10/1988 | Wojtowicz | |
| 4,865,760 A | 9/1989 | Johnson et al. | |
| 4,876,003 A | 10/1989 | Casberg | |
| 4,928,813 A | 5/1990 | Casberg | |
| 4,931,207 A | 6/1990 | Cramer et al. | |
| 4,961,872 A | 10/1990 | Sinclair | |
| 4,970,020 A | 11/1990 | Johnson et al. | |
| 4,973,409 A | 11/1990 | Cook | |
| 5,009,806 A | 4/1991 | Johnson et al. | |
| 5,164,109 A | 11/1992 | Wojtowicz | |
| 5,205,961 A | 4/1993 | Shenefiel et al. | |
| 5,610,126 A | 3/1997 | Bradford et al. | |
| 5,707,534 A | 1/1998 | DelCorral et al. | |
| 5,753,602 A | 5/1998 | Hung et al. | |
| 5,756,440 A | 5/1998 | Watanabe et al. | |
| 5,885,954 A * | 3/1999 | Chicarielli | 510/380 |
| 5,888,528 A | 3/1999 | Wellinghoff et al. | |
| 5,914,040 A | 6/1999 | Fescher et al. | |
| 5,958,853 A | 9/1999 | Watanabe | |
| 6,638,446 B1 * | 10/2003 | Mullins | 252/187.28 |
| 6,776,926 B2 * | 8/2004 | Martin | 252/187.29 |
| 6,969,527 B2 * | 11/2005 | Brennan et al. | 424/464 |
| 6,984,398 B2 | 1/2006 | Brennan et al. | |
| 7,045,077 B2 * | 5/2006 | Garris | 252/186.36 |
| 7,364,669 B2 * | 4/2008 | Garris | 252/186.36 |
| 7,431,863 B2 * | 10/2008 | Pickens | 252/187.3 |
| 7,465,412 B2 * | 12/2008 | Pickens et al. | 252/187.28 |
| 7,695,639 B2 * | 4/2010 | Garris | 252/186.36 |
| 2003/0038277 A1 | 2/2003 | Martin | |
| 2004/0197395 A1 * | 10/2004 | Brennan et al. | 424/464 |
| 2004/0214738 A1 * | 10/2004 | Brennan et al. | 510/298 |
| 2005/0279971 A1 * | 12/2005 | Garris | 252/601 |
| 2006/0081810 A1 * | 4/2006 | Blanchette et al. | 252/175 |
| 2006/0093669 A1 * | 5/2006 | Brennan et al. | 424/464 |
| 2006/0110453 A1 * | 5/2006 | Brennan et al. | 424/464 |
| 2006/0128584 A1 * | 6/2006 | Garris | 510/375 |
| 2007/0210280 A1 * | 9/2007 | Pickens | 252/187.24 |
| 2007/0224108 A1 * | 9/2007 | Garris | 423/474 |
| 2008/0083071 A1 * | 4/2008 | Tremblay et al. | 8/109 |
| 2008/0258104 A1 * | 10/2008 | Mullins et al. | 252/187.28 |

FOREIGN PATENT DOCUMENTS

| | | |
|---|---|---|
| WO | WO 03/014013 A2 | 2/2003 |

* cited by examiner

A multilayer coated calcium hypochlorite

Elemental map analysis of coated sample 3

NaCl in blue, MgSO$_4$·xH$_2$O in yellow; calcium hypochlorite in red

Figure 3. Image of the coated sample 16
Figure 4 Elemental map analysis of the coated sample 16
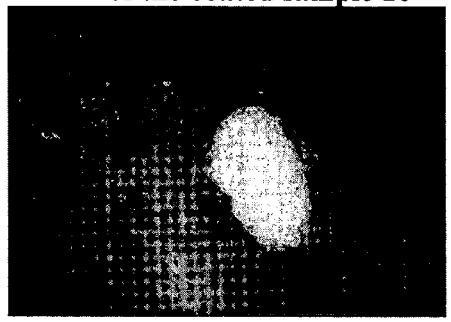
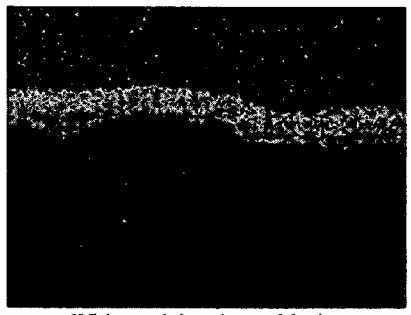
White: calcium hypochlorite
Blue: copper sulfate·$zH_2O$
Calcium hypochlorite in red
Magnesium sulfate·$xH_2O$ in green
Copper sulfate·$zH_2O$ in blue

COATED CALCIUM HYPOCHLORITE COMPOSITION

CROSS-REFERENCE TO RELATED APPLICATIONS

This application claims the benefit of U.S. Provisional Application Ser. No. 60/741,503 filed Dec. 1, 2005, which is incorporated by reference herein in its entirety.

BACKGROUND OF THE INVENTION

1. Field of the Invention

This invention relates to coated calcium hypochlorite compositions having low reactivity in handling, storage and transportation. More specifically, this invention relates to a calcium hypochlorite composition coated with one or more hydrated or anhydrous salts. This invention also relates to a calcium hypochlorite composition additionally coated with at least one active water treatment ingredient as a clarifier, scale inhibitor, dispersant, water softener, corrosion inhibitor, algaecide, fungicide, flocculant, binder or mixtures thereof.

2. Brief Description of Art

Hydrated calcium hypochlorite is classified as a Division-5.1 oxidizer as "dangerous goods" for purposes of transport and storage. As a strong oxidizer, hydrated calcium hypochlorite causes a severe increase in burning intensity and burning rate of combustible materials. Thus, the fire of combustible materials in the presence of hydrated calcium hypochlorite can be quite vigorous. Many efforts have been made to produce hydrated calcium hypochlorite containing products that are not classified as a "Division-5.1 oxidizer" as measured by an internationally recognized standard, i.e. the United Nations Protocol: Transport of Dangerous Good: Manual of Tests and Criteria, Section 34; Classification Procedures, Test Methods, and Criteria relating to Oxidizing Substances of Division 5.1.

Another system for classifying oxidizers is given by the National Fire Protection Association (NFPA). In NFPA 430, Code for the Storage of Liquid and Solid Oxidizer (2004 Edition), the definition of an oxidizer is given as any material that readily yields oxygen or other oxidizing gas, or that readily reacts to promote or initiate combustion of combustible materials and can undergo a vigorous self-sustained decomposition due to contamination or heat exposure. Oxidizers are further broken down according to the degree to which they increase the burning rate of combustible materials as follows:

Class 1: An oxidizer that does not moderately increase the burning rate of combustible materials with which it comes into contact.

Class 2: An oxidizer that causes a moderate increase in the burning rate of combustible materials with which it comes into contact.

Class 3: An oxidizer that causes a severe increase in the burning rate of combustible materials with which it comes into contact.

Class 4: An oxidizer that can undergo an explosive reaction due to contamination or exposure to thermal or physical shock and that causes a severe increase in the burning rate of combustible materials with which it comes into contact.

Calcium hypochlorite is a Class 3 oxidizer according to the NFPA oxidizer classification system.

Recently, U.S. Pat. No. 6,638,446 describes a non Division-5.1 calcium hypochlorite composition consisting of a blend of hydrated calcium hypochlorite and magnesium sulfate heptahydrate. In this invention, the blend comprising of 70 part of 68% calcium hypochlorite and 30 part of magnesium sulfate heptahydrate by total weight of the blend, in which the blend contains at least 17% of total water, and 47% available chlorine, is commercially classified as a non Division-5.1 Oxidizer. Similarly, EP 1464617 A2 discloses a non-Division 5.1 oxidizer tablet having the similar composition of hydrated calcium hypochlorite and magnesium sulfate heptahydrate as described in U.S. Pat. No. 6,638,446. Although these patents discuss the reduced reactivity of the blends, neither U.S. Pat. No. 6,638,446 nor EP 1464617 A2 describes a coated calcium hypochlorite composition.

The approach to coat or encapsulate active hydrated calcium hypochlorite with an inert water-soluble material is well known for the purpose of preventing the contact of calcium hypochlorite and a flammable material and thus to reduce its reactivity and flammability. Several patents have described the processes and coated or encapsulated compositions of hydrated calcium hypochlorite with a variety of coating materials for low reactivity. However, the chemical and physical characterizations of these compositions such as shelf-stability, reactivity, flammability, and Division-5.1 oxidizer classification are not well acknowledged.

For example, the composition disclosed in U.S. Pat. No. 3,953,354 describes an encapsulated calcium hypochlorite composition comprising a core hydrated calcium hypochlorite encapsulated with a coating material consisting with about 5 to about 60% of mixture of calcium hypochlorite dihydrate and about 0.1 to about 15% of a water soluble inert inorganic salt such as NaCl and $CaCl_2$ by weight of the granule. The encapsulated granular product was claimed to resist dusting and caking, and improve retention of its available chlorine on storage. The storage test conducted at 100° C. for 2 hours was not indicative of true storage stability due to the extremely high temperature and very short time frame. The potential for self sustaining decomposition was tested by ignition with lighted matches and burning cigarettes, however, no testing was conducted to determine if the samples would increase the burning rate of combustible materials.

U.S. Pat. Nos. 4,146,676 and 4,048,351 disclose an encapsulation or coating process comprising granular hydrated calcium hypochlorite coated with about 4-46% of a low melting inorganic salt such as aluminum sulfate hydrate by total weight of the encapsulated calcium hypochlorite. Data are given regarding the storage stability, and several of the examples were evaluated for their sensitivity to decomposition by exposure to localized heating (i.e. lighted cigarette) or chemical contamination (i.e. glycerine), however, no testing was conducted to determine if the samples would increase the burning rate of combustible materials. None of the coated compositions was tested according to the Division-5.1 flame test protocol, or evaluated to see if they would increase the burning rate of combustibles.

The compositions disclosed in U.S. Pat. Nos. 4,201,756 and 4,174,411 describe coated calcium hypochlorite with a plurality of layers of inorganic salts which is comprised of chloride, chlorate, nitrate, bromide, bromate, or sulfate salts of Periodic Table Group I alkali metal salts (sodium, potassium, lithium, rubidium, cesium or francium). The layers of salts form a physical barrier, which was claimed to resist dusting and degradation during handling, and also decreases propensity for ignition and self-sustained decomposition when contacted by a lighted match or incompatible organic materials. However, there is little data to support these claims and no data to show whether any of these compositions is a non Division-5.1 oxidizer or if they increase the burning rate of combustibles.

U.S. Pat. No. 4,276,349 described a process for encapsulating calcium hypochlorite that is comprised of a core of calcium hypochlorite encapsulated with a plurality of rounded layers containing a mixture of high percentage of water soluble inorganic salts and calcium hypochlorite. None of the compositions made from the process in the art were specifically characterized and tested for their storage stability and flammability, particularly, according to Division-5.1 Oxidizer classification.

In addition, US Patent Application No. 2003/0038277 A1 and PCT Application WO 03/014013 A2 recently describes a blended or coated calcium hypochlorite process and composition consisting of a polymeric alkali salt and calcium hypochlorite. The composition disclosed in the patent describes an improved environmental stability such as antiflammability by a brake fluid oil test. However, the actual compositions tested in the arts including contents of available chlorine and moisture were not known and specified, and none of the compositions was tested according to the Division-5.1 flame test protocol, and there is little data to support these claims.

The idea to coat or encapsulate active calcium hypochlorite with an inert water soluble inorganic salt in these prior art references was to reduce the contact of calcium hypochlorite and a flammable material and thus to reduce its reactivity and flammability. The particles with a coating of an inorganic salt as the exterior layer have an increased degree of resistance to ignition by lighted cigarettes or the reaction caused when contacted with organic materials. However, ignition tests are quite different in principle from the above oxidizer classification test and the NFPA classification system which rate the increase in burning rate of combustible materials after ignition has already been initiated. The former is a prevention test of ignition of the material when contact with a lighted match, while the UN oxidizer classification test is to determine the potential to increase the burning rate or the burning intensity of the combustible cellulose when two are thoroughly mixed in a specific ratio, by mass, with the product to cellulose. Since little or no fuel is present in the ignition tests, the procedure does not test the oxidizing properties or the ability to increase the burning rate of combustible materials. Many substances will pass the ignition tests, but will still be classified as Division 5.1 Oxidizers.

One of the examples as described in U.S. Pat. No. 4,201,756 was that calcium hypochlorite encapsulated with about 21% of sodium chloride by total weight of the composition prevented ignition of the material when contacted with a lighted match, but it failed to undergo self-sustained decomposition. In contrast, the blend of calcium hypochlorite and sodium chloride by the same weight composition actually accelerate burning, as indicated in U.S. Pat. No. 6,638,446.

Therefore, it is difficult to predict whether any compositions in the prior art can be classified as a non Division-5.1 Oxidizer or as NFPA Class 1 or Class 2 oxidizers. Indeed, a coated non Division-5.1, NFPA Class 1 or NFPA Class 2 granular calcium hypochlorite is not seen both in either the marketplace or the literature.

Accordingly, there is an increasing need in this art to produce a calcium hypochlorite product having high available chlorine that is not classified as a Division 5.1 Oxidizer or NFPA Class 3 oxidizer and which has enhanced safety (i.e. diminished fire producing) properties. Therefore, this invention, by providing a solution to that need, is to specifically describe coated calcium hypochlorite compositions with high available chlorine that is not a Division-5.1 oxidizer or NFPA Class 3 oxidizer, that shows excellent storage stability, and has additional advantages for water treatments. These coated calcium hypochlorite compositions are not considered as dangerous goods for transportation and storage, and thus will provide greater public safety.

In addition, the coated calcium hypochlorite composition of the present invention may provide a composition, which is not a non Division-5.1 oxidizer or NFPA Class 3 oxidizer, but with higher available chlorine, lower reactivity and multifunctional benefits than their corresponding blends for water treatments and cleaning applications.

BRIEF SUMMARY OF THE INVENTION

In one aspect, the present invention is directed to a water treatment composition, comprising: calcium hypochlorite coated with a coating comprising at least one hydrated or anhydrous salt; wherein the composition contains about 20 wt % to about 80 wt % available chlorine based on the total weight of the composition, and wherein the composition contains from about 1 wt % to about 50 wt % of hydrated water based on the total weight of the composition, and wherein the coating comprises from about 1% to about 80 wt % of the total weight of the composition, and wherein the composition is classified as a non Division 5.1 oxidizer or as a NFPA Class 1 or NFPA Class 2 oxidizer.

In another aspect, the present invention is directed to a water treatment composition, comprising: (a) an inner core layer comprising calcium hypochlorite; (b) one or more interlayers positioned on top of the inner core layer, the interlayer comprising one or more hydrated or anhydrous inorganic salts, hydrated or anhydrous organic salts, hydrated or anhydrous polymeric salts, alkaline metal hydroxides, alkaline earth hydroxides, and combinations thereof, the interlayer comprising from about 1% to about 80 wt % of the total weight of the composition; and (c) one or more outer layers positioned on top of the interlayer(s), the outer layers comprising at least one hydrated or anhydrous salt, the outer layer comprising from about 1% to about 35 wt % of the total weight of the composition; wherein the composition contains about 20 wt % to about 80 wt % available chlorine based on the total weight of the composition; wherein the composition contains from about 1 wt % to about 50 wt % of hydrated water based on the total weight of the composition; and wherein the composition is classified as a non Division 5.1 oxidizer or as a NFPA Class 1 or NFPA Class 2 oxidizer.

These and other aspects of the invention will become apparent upon reading the following detailed description of the invention.

BRIEF DESCRIPTION OF THE DRAWINGS

The invention will be better understood when taken in conjunction with the following drawings in which:

FIG. 3 is an image of coated Sample 16 of the present invention; and

FIG. 4 is an elemental map analysis of coated Sample 16 of the present invention.

DETAILED DESCRIPTION OF THE INVENTION

Figure 1:
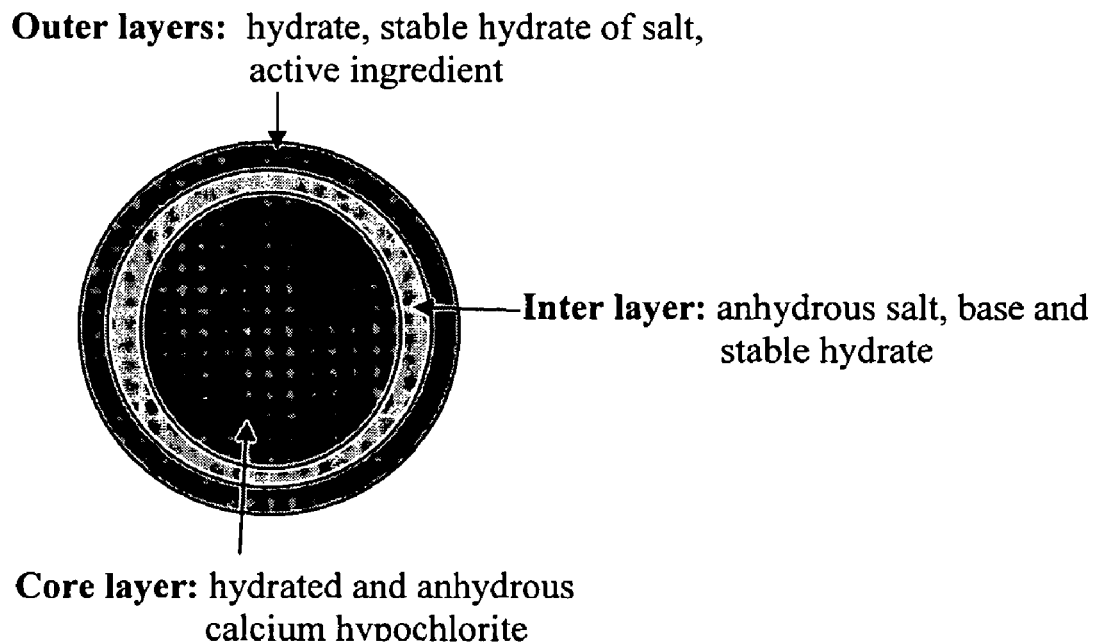
FIG. 1 is a schematic drawing of a multilayer coated calcium hypochlorite embodied by the present invention.

This invention provides an improved coated granular calcium hypochlorite composition for low reactivity in handling, storage and transportation and treatment of microorganisms in pools, spas, water, and other industrial and recreational water applications. The coated calcium hypochlorite composition of the invention is coated with sufficient amounts of one or more hydrated salts to provide a stable non Division-5.1 oxidizer. The preferred hydrated inorganic salts are alkaline and earth alkaline metal salts of halide, sulfate, phosphate, silicate, borate which is relatively stable for at least one day at about 45° C. against their dehydration. The preferred organic and polymeric salts are those alkaline metal salts of organic acid and polymeric acid, and their relatively stable hydrates.

One aspect of this invention is a multilayer coated calcium hypochlorite composition comprising a core of granular calcium hypochlorite coated with one or more hydrated salts. This multilayer coated composition comprises 1) an inner core layer containing hydrated or anhydrous calcium hypochlorite; or a mixture thereof 2) one or more outer layers containing one or more hydrated salts or a mixture thereof; and 3) one or more interlayers containing either an alkaline or alkaline earth metal hydroxide, an inorganic salt, organic salt or polymeric salt, including hydrated and anhydrous forms such salts, or a mixture thereof. These salt coatings prevent chemical interaction of calcium hypochlorite with the hydrated salt coating materials in the outer layer and thus prevent degradation of calcium hypochlorite.

Another aspect of this invention is to produce coated non Division-5.1 oxidizer composition with high available chlorine, excellent storage stability and multifunctional applications for water and other treatments. The coated calcium hypochlorite composition is not considered as dangerous goods for transportation and storage, and will provide a greater public safety.

An additional aspect of this invention is to produce a coated calcium hypochlorite composition wherein either the outer layers or inner layers of the multilayer composition or the single layer coated composition contains a clarifier, scale inhibitor, dispersant, water softener, corrosion inhibitor, algaecide, fungicide or binder to achieve the desired properties of homogeneity, controlled delivery and multifunctional effects in water and other treatment areas.

The preferred multilayer coated calcium hypochlorite composition may employ specific anhydrous or hydrated salts to achieve a total hydrated water content and available chlorine to reduce its reactivity and burning rate towards an active material such as glycol, cellulose, oil, brake fluid and polymeric materials.

The coated calcium hypochlorite compositions of this invention preferably contain about 20 to about 80% available chlorine and about 1 to about 80% of coating materials, and about 1 to about 50% hydrated water, by total weight of the coated composition.

In addition, the coated calcium hypochlorite composition of the present invention may provide a homogenous composition which is not a non Division 5.1 Oxidizer, but have higher available chlorine, and multifunctional benefits than their corresponding blends for water treatment and other applications.

The term "hydrated salt" as used in the present specification and claims is defined as any hydrated inorganic salt, organic salt, polymeric salt and inorganic base, or a mixture thereof. The term "hydrated" as used in this context is meant to include any such salts or bases that contain one or more waters of hydration, including mixtures of waters of hydration.

The term "hydrated" as used in conjunction with calcium hypochlorite in the present specification and claims refers to calcium hypochlorite that has a water content of at least 5% by weight of the calcium hypochlorite. Preferably, these compositions are commercial "hydrated" (5.5% to 16% water) calcium hypochlorite, CAS number 7778-54-3.

The term "anhydrous" as used in the present specification and claims in conjunction with salts is meant to be any unhydrated, inorganic salt, organic salt, polymeric salt or inorganic base or a mixture thereof. The same term when used in conjunction with calcium hypochlorite, refers to calcium hypochlorite having a water content of less than 5% by weight of the calcium hypochlorite.

In accordance with the present invention, the coated calcium hypochlorite particles with a hydrated or anhydrous salt as the exterior layer are to have an increased degree of resistance to ignition by lighted cigarettes, to reduce the burning rate caused by calcium hypochlorite, and to minimize the reaction caused when contacted with organic materials.

Further in accordance with the present invention, there is provided both singular and multilayer coated granular calcium hypochlorite compositions that may be classified as non Division-5.1 oxidizer, wherein the term "non Division 5.1 Oxidizer composition" as used in the present specification and claims refers to any coated compositions of calcium hypochlorite granules with an hydrated or anhydrous inorganic salt, organic salt, polymeric salt, a base, or their hydrate(s), and a mixture thereof, that is not classified as UN Division 5.1 Oxidizer according to standard testing procedures now in effect. Alternatively, the compositions of the present invention may be classified as either NFPA Class 1 or NFPA Class 2 oxidizers.

In addition, the current UN oxidizer classification test may also be performed to determine the potential of a calcium hypochlorite product for increase in the burning rate or the burning intensity of the combustible cellulose when two are thoroughly mixed in both 1:1 and 4:1 ratios, by mass, with the product to cellulose. Moreover, burn tests may also be performed with the product in contact with combustible materials, such as pails and pouches that may be used as packaging, to determine the potential of a calcium hypochlorite product to increase the burning rate of the combustible materials.

It is commonly recognized that the higher the moisture content of calcium hypochlorite composition, the less stable the calcium hypochlorite is. Therefore, suitable and balanced hydrated moisture content of a coating material should be considered to provide relatively stable coated calcium hypochlorite composition with high available chlorine.

The coating materials in the present invention includes "inert" and "water soluble" hydrated and anhydrous inorganic salts, organic salts, polymeric salts, and an optional "active ingredients" wherein the term "inert" as defined as little chemical reactivity to calcium hypochlorite that causes severe degradation and higher reactivity, and the term "hydrate" preferably refers to any hydrated salt that contains over 20% hydrated water content. The term "water soluble" is used as solubility of a salt in water from about 5 to about 100%. The term "active ingredients" refers to a known water treatment chemical which are compatible with calcium hypochlorite. In addition, the term "hydrates" in the present invention include a mixture of hydrates of inorganic salts, organic salts, polymeric salts, and an alkaline and alkaline earth metal hydroxides, and a mixture thereof.

The compositions of this invention preferably involve coated granules of calcium hypochlorite containing one or more coatings of an anhydrous or hydrated salt. The calcium hypochlorite granules in the inner core layer of the present invention, typically, have about 54 to about 80% of available chlorine and about 0% to about 12% content of moisture with particle sizes ranging from about 50 to about 4000 microns in diameter. The typical calcium hypochlorite granules in the inner core layer contain anhydrous, hydrated calcium hypochlorite or a mixture thereof.

The singular coated calcium hypochlorite composition of the present invention comprises a singular coating layer that contains one or more hydrated salts or anhydrous forms of the salts, as well as any optional ingredients listed herein.

Typical examples in the present invention include salts that are known to form high hydrated water with over 20% content of hydrated water such as sodium sulfates, lithium metaborate, sodium carbonate, sodium orthophosphate, sodium monohydrogen orthophosphate, sodium phosphate, sodium pyrophosphate, sodium tetraborate, sodium silicate, aluminum sulfate, sodium metasilicate, sodium aluminum sulfate, magnesium sulfate, aluminum potassium sulfate, zinc sulfate, copper sulfate, and sodium citrate and poly(acrylic acid-maleic acid) sodium salt. These salts are most likely to form hydrated salt with high content of hydrated water (waters of hydration) when their aqueous solution is spray dried under the coating conditions.

According to one preferred embodiment of the present invention, the coating material may optionally contain an additional active ingredient for pool, spa and water treatment, such as water clarifiers, scale inhibitors, water softeners, corrosion inhibitors, algaecides, fungicides, binders, or a mixture thereof. Such ingredients, as well as others, are known to those of skill in the art. Particularly, the additional active ingredient in the present invention includes active ingredient components having known functional properties such as copper sulfate, zinc sulfate, aluminum sulfate, sodium citrate, sodium borate, sodium tripolyphosphate (STPP), sodium hexametaphosphate (SHMP), 1,3-dichloro-5,5-dimethylhydantoin (DCDMH), 1,3-dibromo-5,5dimethylhydrantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-methyl-5-ethylhydantoin (BCEMH), trichloro-, dichloro- and monochlorotriazine, sodium dichloro-s-triazinetrione dichloride, their hydrated form, and a mixture thereof. Amounts of these additional active ingredients preferably range from about 0.1 to about 5 wt %, based on the total weight of the coated composition.

The total content of the coating material in the preferred coated calcium hypochlorite composition in the present invention is from about 1 to about 80% by weight, and the total available chlorine of the granular calcium hypochlorite is from about 20 to about 80%, based by total weight of the coated calcium hypochlorite compositions. The content of total moisture of the coated granular calcium hypochlorite is about 1% to about 50% based on the total weight of coated calcium hypochlorite composition. The preferred content of hydrated water in the coating material is greater than 15%, preferably, greater than 20% by total weight of coating materials.

The multilayer coated calcium hypochlorite composition in the present invention may comprise at least three layers as shown in FIG. 1: 1) a inner core layer containing anhydrous or hydrated calcium hypochlorite granules; 2) an interlayer containing an anhydrous inorganic salt, organic salt, polymeric salt, or an alkaline or alkaline earth base, or its stable hydrate(s), or a mixture thereof, as a protective layer against interfacial interaction of calcium hypochlorite and the coating materials in the outer layers; 3) an outer layer containing a water soluble anhydrous hydrate and hydrated inorganic salt, organic salt or polymeric salt, active water treatment chemicals, or a mixture thereof.

The coating material in the outer layers of the present invention contains at least one anhydrous or hydrated salt as described above for the coating materials in the singular coated calcium hypochlorite. The preferred hydrate of salt that is a hydrate with high percentage of hydrated water when it is dissolved in water, and then dried under the coating conditions.

More preferably, according to the present invention, the preferred hydrated salt in the outer layer is one that has low heat conductivity, and generates the highest contents of hydrated water by weight of coating material upon coating, and dehydrate all or most of the hydrated water below about 200° C. These salts are most likely to produce a multilayer coated non Divison-5.1 calcium hypochlorite with highest possible available chlorine.

Many inorganic salts and their hydrates are known and available, and are selected for making coating solution to coat granular calcium hypochlorite in the present invention. Typical examples in the present invention include salts that are known to form high hydrated water described as coating materials for the singular layer coated calcium hypochlorite.

Any combination of hydrated or anhydrous salts can be employed to make an aqueous solution for the outer layer coating. A hydrated salt is also made in-situ from the corresponding oxide with the corresponding acid as the coating solution. For example, 20% aqueous magnesium sulfate solution can be made from magnesium oxide and sulfuric acid in about 1:1 molar ratio in the suitable amount of water at room temperature.

The concentration of a salt in coating solution can vary depending on its solubility and viscosity for coating process, and the content in the coating materials, and preferably, a high concentration is applied for more cost considerations. The choices of particular salts are known to those of skill in the art.

In the most preferred embodiment of this invention, the inorganic salts and their hydrates used to generate aqueous solution for outer layers coating include magnesium sulfate, sodium phosphate, sodium pyrophosphate, copper sulfate, a hydrate of these salts, or a mixture thereof. An aqueous solution of such salt or its hydrate produces the solid hydrate or a mixture of the hydrates upon coating depending on the coating conditions.

For example, when the solution made from magnesium sulfate, hydrated forms of magnesium sulfate, such as magnesium sulfate heptahydrate, or from magnesium oxide and sulfuric acid, magnesium sulfate hydrates with hydration number from 3 to 7 under different coating conditions. The coated granular calcium hypochlorite composition with magnesium sulfate tetrahydrate with an average hydrated number of 3-4 provides better storage stability than its higher hydrated forms.

The outer layers of the coated calcium hypochlorite composition according to the present invention also include an anhydrous and/or hydrated alkaline or alkaline earth metal organic salt or polymeric salts. Examples of organic and polymeric salts include a sodium salt of citric acid, benzoic acid, oxalic acid, polyacrylic acid, polymaleic acid, poly(acrylic acid-co-maleic acid), polyepoxysuccinic acid, and its stable hydrates. The polymeric salt generally is a part of the coating materials with a anhydrous and/or hydrated inorganic salt. The content of the polymeric salt is about 0.5 to about 15% by weight of the all coating materials.

The total content of the coating material in the outer layers in a preferred embodiment of the present invention is from about 1 to about 35% by total weight of the coated calcium hypochlorite composition. The total content of the moisture of the coating materials in the outer layers in the present invention is greater than 15%, preferably, greater than 20% by weight of coating materials.

The outer layers of the coated calcium hypochlorite in the present invention may include an active ingredient such as a clarifier, scale inhibitor, water softener, corrosion inhibitor, algaecide, fungicide or binder, or a mixture thereof. The preferred examples are those active ingredients described as an active ingredient in the singular coated granular calcium hypochlorite. Amounts of these additional active ingredients preferably range from about 0.1 to about 5 wt %, based on the total weight of the coated composition.

The interlayer composition in the present invention contains an anhydrous and/or hydrated inorganic salt, organic salt and polymeric salt or an alkaline or alkaline earth metal hydroxide, or a mixture thereof. The alkaline and alkaline earth metal hydroxide, and anhydrous salt, and its hydrate in the interlayer described in the present invention are used as a protective layer from surface-surface interaction of calcium hypochlorite, and the hydrates and other ingredients in the outer layers against loss of chlorine over storage and transportation.

According to the present invention, the interlayer typically contains anhydrous and/or less hydrated alkaline metal chlorides, sulfates, phosphates, silicates or borates, and an alkaline and earth alkaline metal hydroxide. The preferred salt and base are sodium chloride, sodium sulfate, sodium borate, sodium silicate, lithium hydroxide and calcium hydroxide. Components of the interlayer may also be active ingredients.

Calcium hypochlorite decomposes rapidly in the presence of an acid, and is more stable above pH 9. Therefore it is preferred to keep the compositions in the interlayer from acidic pH ranges. The use of a metal hydroxide in the interlayer is to stabilize calcium hypochlorite against its decomposition by maintaining the basic pH of the coated calcium hypochlorite, and to absorb the chlorine generated during storage. The preferred metal hydroxide is calcium hydroxide.

The content of the coating materials in the interlayer is about 1 to about 80%, preferably, about 3 to about 75% based on total weight of coated calcium hypochlorite composition. The total available chlorine of the multilayer coated calcium hypochlorite is from about 20 to about 80%, and the content of total moisture is about 1 to about 50% by total weight of coated calcium hypochlorite. The thickness of the singular and multilayer coated calcium hypochlorite particles is controlled by particle size of calcium hypochlorite and amount of coating materials used for coatings. Typically, according to the present invention, the thickness of coating is between 10-200 μm.

According to the present invention, SEM and elemental map techniques are used to characterize shape, layer uniformity of coating, EDS is used to determine the thickness of coating, and XRD is used to determine the hydrate form of calcium hypochlorite and salt.

The amount of moisture in the coated calcium hypochlorite may be determined by any standard analytical method for measuring water in calcium hypochlorite and coated calcium hypochlorite compositions. The preferred method is thermogravimetric analysis (TGA). The hydrate form of the coating material was also revealed based the weight of moisture contributed to the coating material over the weight of the coating material employed.

The available chlorine of the coated calcium hypochlorite is determined by a standard analytical method used for assay of a typical calcium hypochlorite unless the method is interfered by a coating material.

The coated granular calcium hypochlorite composition in the present invention comprises of about 1 to about 50%, preferably, about 4 to about 30% of the hydrated moisture content, and about 20 to about 80%, preferably about 30% to about 60% available chlorine by weight of the coated calcium hypochlorite granules. The particle sizes of coated granules are in a range from about 40 to about 5,000 μm, preferably about 200 to about 5,000 μm in diameter.

Based on the present invention, the coated granular calcium hypochlorite provides many advantages over the corresponding blend. For example, when the granular calcium hypochlorite containing 68% available chlorine with the particle size of about 200 to about 2000 microns is applied for coating with hydrates of magnesium sulfate, the resulting coated calcium hypochlorite composition contains about 56% available chlorine, about 18% hydrated magnesium sulfate, and less than 14% hydrated moisture by weight of the total coated calcium hypochlorite granules. However, when the calcium hypochlorite is used to blend with magnesium sulfate heptahydrate, the calcium hypochlorite blend contains only about 47% available chlorine, about 30% magnesium sulfate heptahydrate, and about up to 20.4% hydrated moisture by total weight of the blend.

Most importantly, the specifically coated calcium hypochlorite composition in the present invention not only contains higher available chlorine, but also provides excellent stability on elevated temperatures than its corresponding blend.

For example, the coated granular calcium hypochlorite composition containing about 54% available chlorine, about 21% magnesium sulfate hydrates where the majority of the hydrates are magnesium sulfate tetrahydrate, and about 10% hydrated moisture by total weight of the composition is classified as a non Division-5.1 oxidizer with excellent oven stability over 10, 20 and 30 days at 45° C. However, the maximum available chlorine of the calcium hypochlorite blend with magnesium sulfate heptahydrate is only about 47.8% available chlorine, and the oven stability of the blend at 45° C. was not good as the coated composition.

In addition, the coated granular calcium hypochlorite composition containing about 47% available chlorine, about 29% magnesium sulfate tetrahydrate, and about 10% hydrated moisture with anhydrous calcium hypochlorite in the inner core layer from the calcium hypochlorite containing 68% available chlorine show the excellent stability with little loss of available chlorine over 30 days at 45 to 50° C.

Similarly, the excellent stability with little loss of available chlorine were observed over 30 days at 45 to 50° C. for the coated granular calcium hypochlorite composition wherein the sample consists with about 56% available chlorine, about 28% magnesium sulfate tetrahydrate, and about 10% hydrated moisture with anhydrous calcium hypochlorite in the inner core layer from the calcium hypochlorite with 78% available chlorine. The coated granular calcium hypochlorite is much more stable than the uncoated and their blends with magnesium sulfate heptahydrate.

Additionally, the coated granular calcium hypochlorite in the present invention provides another advantage over the corresponding blend. For example, when the granular calcium hypochlorite containing 68% available chlorine with the particle size of about 200 to about 2000 microns is coated with hydrates of magnesium sulfate, the resulting coated calcium hypochlorite composition with about 52% available chlorine, and about 9.5% hydrated moisture by weight of the total coated calcium hypochlorite granules is classified as both non Division-5.1 and NAFP-1 oxidizer. However, when the blend of the calcium hypochlorite with magnesium sulfate hydrates containing the same available chlorine and moisture are not non Division-5.1 and NFPA-1 oxidizers.

A coated calcium hypochlorite composition in the present invention is typically produced by a spray fluid bed coater such as Mini-Glatt and GPCG-1 from Glatt Air Technologies, Inc., and ACT 100N and ACT 300N from Applied Chemical Technology, Inc. The variables and conditions of coating are specifically controlled to have minimum wetting on the surface of the calcium hypochlorite particles, and generate suitable mixtures with hydrated salts. A multiple layer coating is accomplished by sequential feeding of deemed coating materials under suitable coating conditions. Coating may be conducted using either a batch or continuous process. Additionally, according to the present invention, a continuous feeding of aqueous coating solution is used to produce a controlled single or multilayer coated granular calcium hypochlorite composition.

The many factors in the coated calcium hypochlorite composition, such as available chlorine, hydrated form, type and heat conductivity of coating materials, stability of the hydrates against its dehydration, total hydrated moisture content, consequential coating layers, are important to reduce its reactivity and burning rate towards an active material such as glycol, cellulose, brake oil, fluid and polymeric materials, and improve its storage stability and performance for water and other treatments.

The coated granular calcium hypochlorite compositions of the present invention are ready for packaging, storage, shipping for use in the treatments of water and the like. Specifically, the coated granules are useful as water treatment sanitizers (e.g. in swimming pools and spas), industrial water treatments, and the like, and are especially safer to transport and store than calcium hypochlorite itself.

According to the present invention, the coated calcium hypochlorite composition is blended in a suitable ratio with other additives including hydrates of inorganic salt, organic salt and polymeric salt, and clarifier, scale inhibitor, flocculants, corrosion inhibitor, algaecide, fungicide and other pool, spa and water treatment additives.

Finally, according to the present invention any shape and forms of calcium hypochlorite including tablets, pellets, briquette, round, irregular, and in any size, can be coated with the coating materials described above, and provide similar benefits over the corresponding blends.

According to the present invention, the coating technology is suitable for coating other pool, spa, and water treatment actives for low reactivity and better stability in handling, storage and transportation, and for control of microorganisms.

The following examples are further intended to illustrate, but in no way limited, the scope of the present invention. All parts and percentages are by weight and all temperatures are degrees Celsius unless explicitly stated otherwise.

EXAMPLES

The following samples cited in the present invention further describe and demonstrate the preferred embodiments within the scope of the present invention. The examples are given solely for the purpose of illustration, and are not to be understood as limitations of the present invention since many variations thereof are possible within the scope.

General Procedures

The moisture and available chlorine analyses were carried out using the standard methods employed for analysis of the uncoated calcium hypochlorite. The flame test method for oxidizing substances described in Section 34 of the United Nations Protocol was used to determine the characteristics of the various coated calcium hypochlorite products described below. The detailed test method is described in the United Nations Recommendations on the Transport of Dangerous Goods; Manual of Tests and Criteria; Third Revised Edition; Section 34 "Classification Procedures, Test Methods and Criteria Relating to Oxidizing Substances of Division 5.1. The percent moisture values shown in the Tables that follow are based on the values obtained from a moisture balance. Due to the constraints of this method, these values are approximate.

For classification, a Non Division-5.1 Oxidizer is a substance which, in both the 4:1 and 1:1 sample-to-cellulose ratios (by mass) tested, does not ignite and burn, or exhibit mean burning times greater than that of a 3:7 mixture (by mass) of potassium bromate and cellulose, where the burning time is taken from when the power is switched on to when the main reaction (e.g. flame, incandescence or glowing combustion) ends.

A medium scale burn testing of packaged granular formulated calcium hypochlorite, packaged salt and empty packaging was used to measure and compare the convective rate of heat release, radiant heat flux, mass loss of the packaged granular product, packaged salt and empty packaging when exposed to a 46 kW propane fire. The result is used to determine the contribution of the granular oxidizer to the burning rate of typical combustible packaging materials.

The coated calcium hypochlorite in the following examples is typically produced by a spray fluid bed coater such as Mini-Glatt and GPCG-1 from Glatt Air Technologies, Inc., and ACT 100N and ACT 300N from Applied Chemical Technology, Inc., at inlet air temperature of 50-75° C. and product temperatures of 35-55° C. A multiple layer coating was accomplished by sequential feeding of coating materials under the conditions at the same or different inlet and product temperatures. The pump rate of a coating solution was specifically controlled to achieve suitable particle wetting and drying to minimize loss of available chlorine. As is known in the art, although these examples were made using a batch process, other processes, such as continuous processes, may also be employed for production of these materials.

Example 1

Coated Calcium Hypochlorite Compositions and Classification

Table 1 tabulates the coated calcium hypochlorite compositions of the samples 1-10 including type of calcium hypochlorite, available chlorine and composition, coating material and moisture, and Division-5.1 classification. The composition of the starting uncoated calcium hypochlorite contained about 68% available chlorine, about 6.6% moisture with typical particle size in the range of 200-2000 μm in diameter. In Table 1, Samples 1 to 9 include calcium hypochlorite: 68% available chlorine, particle size: ~200-2000 μm with ~6.6% moisture; Sample 10 includes calcium hypochlorite: 78% available chlorine, particle size: ~100-2000 μm with ~10.2% moisture, was used for coating. Percentages of ingredients refer to weight percents.

TABLE 1

Composition Of The Coated Granular Calcium Hypochlorite And Classification

| | Coated Calcium Hypochlorite Granules Composition | | | | | | Non |
|---|---|---|---|---|---|---|---|
| Sample # | Core layer | 1st layer | 2nd layer | 3rd layer | AvCl** (%) | Moisture (%) | Division 5.1 |
| 1 | 77.3% $Ca(OCl)_2 \cdot xH_2O$ | 0.7% NaOH | 22.0% $MgSO_4 \cdot xH_2O$ | — | 52.2 | 17.1 | Yes |
| 2 | 83.4% $Ca(OCl)_2 \cdot xH_2O$ | 0.7% NaOH | 13.4% $MgSO_4 xH_2O$ | 2.5% poly(AM) Na·$nH_2O$* | 55.9 | 13.8 | Yes |
| 3 | 82.0% $Ca(OCl)_2 \cdot xH_2O$ | 1.8% NaCl | 16.2% $MgSO_4 xH_2O$ | — | 55.0 | 14.0 | Yes |
| 4 | 81.5% $Ca(OCl)_2 \cdot xH_2O$ | 1.6% $Ca(O)_2$ | 16.9% $MgSO_4 \cdot xH_2O$ | — | 51.3 | 15.0 | Yes |
| 5 | 80.7% $Ca(OCl)_2 \cdot xH_2O$ | — | 19.3% $MgSO_4 \cdot xH_2O$ | — | 54.7 | 10.9 | Yes |
| 6 | 74.3% $Ca(OCl)_2 \cdot xH_2O$ | 1.5% NaCl | 24.2% $MgSO_4 \cdot xH_2O$ | — | 50.9 | 8.7 | Yes |
| 7 | 80.5% $Ca(OCl)_2 \cdot xH_2O$ | — | 19.5% $MgSO_4 \cdot xH_2O$ | — | 54.4 | 9.2 | Yes |
| 8 | 73.6% $Ca(OCl)_2 \cdot xH_2O$ | — | 26.4% $MgSO_4 xH_2O$ | — | 50.8 | 9.6 | Yes |
| 9 | 69% $Ca(OCl)_2 \cdot xH_2O$ | — | 31% $MgSO_4 \cdot xH_2O$ | — | 47.2 | 10.2 | Yes |
| 10 | 72% $Ca(OCl)_2 \cdot xH_2O$ | — | 28% $MgSO_4 \cdot xH_2O$ | — | 56.1 | 10.4 | Yes |

*Poly(AM)Na: poly(acrylic acid-co-maleic acid) sodium salt;
**AvCl: Available chlorine XRD analysis of samples 5 to 8 indicates that the calcium hypochlorite in the inner core layer consists with a mixture of about 70% anhydrous and about 30% hydrated calcium hypochlorite where the uncoated calcium hypochlorite contains at least 70% hydrated form of calcium hypochlorite, and the inner core layer of the samples 9 and 10 contain almost all anhydrous calcium hypochlorite. XRD analysis of the magnesium sulfate hydrate in the outer layer showed that the majority is its tetrahydrate. The wet analysis of the moisture of the coated samples 1 to 4 indicates that hydrates of magnesium sulfate in the composition contain an average hydrated water of about 6.

As data in Table 2 indicate, the coated samples 6 to 8 show similar oven stability as the uncoated calcium hypochlorite at 45° C. over 10, 20 and 30 days, which is believed to be simulated as 1, 2 and 3 years of storage time under ordinary storage conditions. Surprisingly, the coated samples 9 and 10 show the excellent stability over 30 days at 45° C. Little loss of available chlorine was observed.

TABLE 2

Oven Stability Of Coated vs.Uncoated Calcium Hypochlorite At 45° C.

| Sample | AvCl % After 0 day | AvCl loss % after 10 days | AvCl loss After 20 days | AvCl loss after 30 days |
|---|---|---|---|---|
| uncoated | 69.2 | 2.9 | 8.7 | 15.9 |
| 5 | 54.5 | 4.4 | 16.3 | 26.4 |
| 6 | 50.9 | 3.5 | 7.0 | 12.7 |
| 7 | 54.4 | 4.6 | 8.6 | 16.7 |
| 8 | 50.8 | −0.18 | 7.5 | 11.8 |
| 9 | 47.2 | −1.3 | −0.09 | −1.54 |
| 10 | 56.1 | −0.3 | 1.0 | 3.3 |

Table 3 tabulates the comparison of example 7 and the corresponding blend including type of calcium hypochlorite, available chlorine, composition, coating material and moisture against their Division-5.1 classification. The composition of the starting uncoated calcium hypochlorite contained 69% available chlorine, about 9.2% moisture with an average particle size in the range of 200-2000 μm in diameter.

TABLE 3

Composition Of The Coated Granular Calcium Hypochlorite And Classification (Calcium hypochlorite: ~78% AvCl with particle size ~100 to 2000 μm in Samples 11 and 8)

| Sample ID | Core calcium hypochlorite | Coating material and its content in the coated product outer layer | AvCl (%) | Moisture (%) | Non Division-5.1 |
|---|---|---|---|---|---|
| 7 | 80.5% | 19.5% $MgSO_4 \cdot xH_2O$ | 54.4 | 9.2 | yes |
| | 80/20 blend of calcium hypochlorite/$MgSO_4 \cdot 7H_2O$ | | 54.5 | 15.3 | NO |

As shown in Table 3, the blended sample with magnesium sulfate heptahydrate having the same available chlorine as the coated sample 7 is not a non Division-5.1 oxidizer.

Table 4 show some benefits of the coated calcium hypochlorite composition vs. the corresponding blends over available chlorine and Division-5.1 classification. In Table 4, samples 2 and 11 contain calcium hypochlorite ~68% AvCl, particle size: ~200-2000 μm. Samples 12 and 13 contain ~78% AvCl with particle size ~100 to 2000.

TABLE 4

Comparison of blend and coated Non Division-5.1 oxidizers

| Sample # | method | Coated Calcium Hypochlorite Granules Composition | | AvCl (%) | Moisture (%) | Non Division-5.1 |
|---|---|---|---|---|---|---|
| | | $Ca(OCl)_2 \cdot xH_2O$ | Coating material | | | |
| 11 | blending | 70% | 30% $MgSO_4 \cdot 7H_2O$ | 47.6 | 19.6 | Yes |
| 2 | coating | 83% | 0.7% NaOH + 14% $MgSO_4 \cdot xH_2O$ + 2.5% poly(AM)Na$\cdot xH_2O$ | 55.9 | 13.8 | Yes |
| 12 | blending | 70% | 30% $MgSO_4 \cdot 7H_2O$ | 54.4 | 24.1 | Yes |
| 13 | coating | 75% | 0.6% NaOH + 25% $MgSO_4 \cdot xH_2O$ | 57.7 | 19.7 | Yes |

The results in Tables 4 demonstrate that the coated non Division-5.1 samples 2 and 13 provide higher available chlorine than the corresponding blended Division-5.1 samples 11 and 12 even where the moisture contents of the coated samples are much lower than the corresponding blended sample.

Table 5 shows the relative burning time benefits of other samples coated with other coating materials vs. their corresponding blends. Longer burning times were observed from the coated calcium hypochlorite compositions based on similar available chlorine and the same components used as coating materials although the moisture contents in the coated samples are lower than their blends. In Table 5, each sample contains calcium hypochlorite: 68% available chlorine, particle size: ~200-2000 μm with ~6.6% moisture.

the particles with calcium hypochlorite in the inner core layer, sodium chloride in the interlayer and magnesium sulfate hydrates in the outer layer.

The SEM and EDS analyses also demonstrate the multilayer coating of sample 18, as shown in FIGS. 3 and 4. FIG. 4 shows that sample 18 is coated with magnesium sulfate hydrates in the interlayer and copper sulfate hydrates in the outer layer. Microscopic image and EDS analysis of the coating via cross section of the cut particles was revealing as shown in FIGS. 3 and 4. The coating shown with a blue color material in FIG. 3 is copper sulfate hydrate, and is about 25 μm thick over about 1 mm diameter particle. The elemental map analysis shows clearly two layers with magnesium sulfate hydrates in the interlayer and copper sulfate hydrates in the outer layer. The copper sulfate hydrate coating was shown

TABLE 5

Comparison Of Blend And Coated Calcium Hypochlorite Composition

| Sample # | method | Coated calcium hypochlorite granules composition | | AvCl (%) | Moisture (%) | Burning time (sec) |
|---|---|---|---|---|---|---|
| | | $Ca(OCl)_2 \cdot H_2O$ | Coating material | | | |
| 14 | blend | 80% | 20% $MgSO_4 \cdot xH_2O$ | 54.0 | 16.2 | 84 |
| 15 | coating | | 0.4% NaOH + 16% $MgSO_4 \cdot xH_2O$ | 56.1 | 13.0 | 100 |
| 16 | blending | 80% | 20% $Na_3PO_4$—$12H_2O$ | 54.0 | 16.2 | 62 |
| 17 | coating | 83% | 17% $Na_3PO_4$—$12H_2O$ | 55.4 | 14.1 | 83 |
| 18 | coating | 82% | 3% $Na_3PO_4 \cdot yH_2O$ + 6% $MgSO_4 \cdot xH_2O$ + 9% $CuSO_4 \cdot zH_2O$ | 54.7 | 12.2 | 81 |
| 19 | coating | 83% | 15% $Na_3PO_4 \cdot yH_2O$ + 2% poly(AM)Na$\cdot nH_2O$* | 55.7 | 13.7 | 90 |

*poly(AM)Na$\cdot nH_2O$: poly(acrylic acid-co-maleic acid) sodium$\cdot nH2O$

For example, the sample 15, coated with magnesium sulfate hydrate, shows 19% longer burning time than the blended sample 14 with magnesium sulfate heptahydrate wherein the coated sample 15 even has higher available chlorine and lower hydrated moisture. Similarly, 34% longer burning time was observed from the coated sample 17 vs. the blended sample 16 with sodium phosphate dodecahydrate.

In addition, more than 30% longer burning time was observed from the multilayer coated sample 18 with hydrates of sodium phosphate, magnesium sulfate and copper sulfate, and the sample 19 with hydrates of sodium phosphate and poly(AM)Na vs. the blend sample 16 with sodium phosphate dodecahydrate.

SEM, EDS and XRD analyses, and the elemental map techniques are particularly employed for characterization of features of coated samples.

Figure 2:
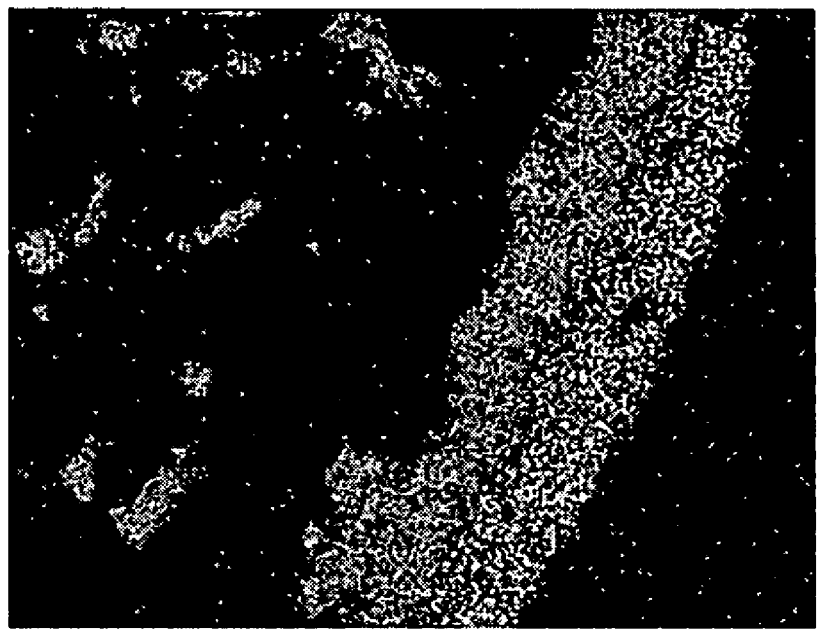
FIG. 2 is an elemental map analysis of Sample 3 of the present invention.

FIG. 2 shows the elemental map analysis of the coated sample 3, and demonstrates the multilayer uniform coating of to be rather uniform and around 15-20 μm thick, while magnesium sulfate hydrate coating was the more variable and thinner coating with about 7-15 μm thick.

While the present invention is primarily directed to having anhydrous or hydrated calcium hypochlorite as the core materials and hydrated salts as the coating material, the invention may also encompass other embodiments where the above-noted active ingredients are part of or all of the core material. Preferably, other sanitizing oxidizers such as trichloroisocyanuric acid (TCCA) sodium dichloroisocyanurate (SDCC), and chloro and bromo hydantoins as well as mixtures of sanitizing oxidizers may be useful as such alternative core material. Moreover, other coating materials such as organometallics could be used as alternative coating materials instead of the above-noted salt materials. Furthermore, the present invention also encompasses the use of other well known coating techniques such as the use of core-shell particles to make the coated compositions. The composition of such core-shell particles could vary from 10% average chlorine (AvCl) content up to 80% average chlorine (AvCl) content.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A dried water treatment composition exhibiting reduced chlorine loss during storage, comprising:
    calcium hypochlorite coated with a coating material comprising magnesium sulfate with an average hydrate number of about 4, said calcium hypochlorite being at least 70 wt. % anhydrous calcium hypochlorite;
    wherein said dried composition contains about 47 wt % to about 58 wt % available chlorine based on the total weight of said dried composition, and
    wherein said dried composition contains from about 9 wt % to about 11 wt % of hydrated water based on the total weight of said dried composition, and
    wherein said coating comprises from about 24 wt % to about 31 wt % of the total weight of said dried composition, and
    wherein said dried composition exhibits both reduced chlorine loss during storage and reduced oxidizing properties thereby qualifying as a non-Division 5.1 oxidizer or as a NFPA Class 1 or NFPA Class 2 oxidizer and;
    wherein said coating material further comprises one or more additional ingredients selected from the group consisting of water clarifiers, scale inhibitors, dispersants, water softeners, corrosion inhibitors, algaecides, fungicides, binders, and combinations thereof, and wherein said additional ingredients are present in an amount ranging from 0.1 to 5 wt %, based on the total weight of the composition.

2. The water treatment composition of claim 1, wherein said calcium hypochlorite are particles having a diameter ranging from about 40 to about 5000 microns.

3. The water treatment composition of claim 2, wherein said calcium hypochlorite are particles having a diameter ranging from about 200 to about 5000 microns.

4. The water treatment composition of claim 1, wherein said composition contains about 10 wt % of hydrated water based on the total weight of said composition.

5. The water treatment composition of claim 1, wherein said additional ingredients are selected from the group consisting of copper sulfate, zinc sulfate, aluminum sulfate, sodium citrate, sodium borate, sodium tripolyphosphate (STPP), sodium hexametaphosphate (SHMP), 1,3-dichloro-5,5-dimethylhydantoin (DCDMH), 1,3-dibromo-5,5-dimethylhydrantoin (DBDMH), 1-bromo-3-chloro-5,5-dimethylhydantoin (BCDMH), 1,3-d-chloro-5-ethyl-5-methylhydantoin (DCEMH), 1,3-dibromo-5-ethyl-5-methyl hydantoin (DBEMH), 1-bromo-3-chloro-5-methyl-5-ethyl-hydrantoin (BCEMH), trichloro-, dichloro- and monochlorotriazine, sodium dichloro-s-triazinetrione dichloride, their hydrated form, and combinations thereof.

6. The water treatment composition of claim 1, wherein said calcium hypochlorite is substantially all anhydrous calcium hypochlorite.

7. The water treatment composition of claim 1, wherein said composition is formed into a tablet or briquette.

8. The water treatment composition of claim 1, wherein said coating material is magnesium sulfate tetrahydrate.

9. A dried water treatment composition exhibiting reduced chlorine loss during storage, comprising:
    (a) an inner core layer comprising calcium hypochlorite, said calcium hypochlorite being at least 70 wt. % anhydrous calcium hypochlorite;
    (b) one or more interlayers positioned on top of said inner core layer, said interlayer comprising one or more hydrated or anhydrous inorganic salts, hydrated or anhydrous organic salts, hydrated or anhydrous polymeric salts, alkaline metal hydroxides, alkaline earth hydroxides, and combinations thereof, said interlayer comprising from about 1 wt % to about 5 wt % of the total weight of said dried composition; and
    (c) one or more outer layers positioned on top of said interlayer(s), said outer layers being magnesium sulfate with an average hydrate number of about 4; said outer layer comprising from about 24 wt % to about 31 wt % of the total weight of said dried composition;
    wherein said dried composition contains about 47 wt % to about 58 wt % available chlorine based on the total weight of said dried composition;
    wherein said composition contains from about 9 wt % to about 11 wt % of hydrated water based on the total weight of said dried composition;
    and wherein said dried composition exhibits both reduced chlorine loss during storage and reduced oxidizing properties thereby qualifying as a non Division 5.1 oxidizer or as a NFPA Class 1 or NFPA Class 2 oxidizer;
    and wherein said one or more outer layers further comprise one or more additional ingredients selected from the group consisting of water clarifiers, scale inhibitors, dispersants, water softeners, corrosion inhibitors, algaecides, fungicides, binders, and combinations thereof, and wherein said additional ingredients are present in an amount ranging from 0.1 to 5 wt %, based on the total weight of the composition.

10. The water treatment composition of claim 9, wherein said calcium hypochlorite are particles having a diameter ranging from about 40 to about 5000 microns.

11. The water treatment composition of claim 10, wherein said calcium hypochlorite are particles having a diameter ranging from about 200 to about 5000 microns.

12. The water treatment composition of claim 9, wherein said composition contains about 10 wt % of hydrated water based on the total weight of said composition.

13. The water treatment composition of claim 9, wherein said outer layer further comprises one or more additional agents selected from the group consisting of copper sulfate, zinc sulfate, aluminum sulfate, sodium citrate, sodium borate, sodium tripolyphosphate (STPP), sodium hexametaphosphate (SHMP), 1,3-dichloro-5,5-dimethylhydantoin (DCDMH), 1,3-dibromo-5,5-dimethylhydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-methyl-5-ethylhydantoin (BCEMH), trichloro-, dichloro- and monochlorotriazine, sodium dichloro-striazinetrione dichloride, their hydrated form, and combinations thereof, and wherein said additional ingredients are present in an amount ranging from 0.1 to 5 wt %, based on the total weight of the coated composition.

14. The water treatment composition of claim 9, wherein said calcium hypochlorite is substantially all anhydrous calcium hypochlorite.

15. The water treatment composition of claim 9, wherein said interlayer is a salt selected from the group consisting of sodium chloride, sodium sulfate, sodium borate, sodium silicate, lithium hydroxide, calcium hydroxide, and combinations thereof.

16. The water treatment composition of claim 9, wherein said composition is formed into a tablet or briquette.

17. The water treatment composition of claim 9, wherein said outer layer is magnesium sulfate tetrahydrate.

18. A dried water treatment composition exhibiting reduced chlorine loss during storage, comprising:
calcium hypochlorite coated with magnesium sulfate tetrahydrate, said calcium hypochlorite being at least 70 wt. % anhydrous calcium hypochlorite;
wherein said dried composition contains about 47 wt % to about 58 wt % available chlorine based on the total weight of said dried composition, and
wherein said dried composition contains from about 9 wt % to about 11 wt % of hydrated water based on the total weight of said dried composition, and
wherein said coating comprises from about 24 wt % to about 31 wt % of the total weight of said dried composition, and wherein said dried composition exhibits both reduced chlorine loss during storage and reduced oxidizing properties thereby qualifying as a non-Division 5.1 oxidizer or as a NFPA Class 1 or NFPA Class 2 oxidizer; and
wherein said coating material further comprises one or more additional ingredients selected from the group consisting of water clarifiers, scale inhibitors, dispersants, water softeners, corrosion inhibitors, algaecides, fungicides, binders, and combinations thereof, and wherein said additional ingredients are present in an amount ranging from 0.1 to 5 wt %, based on the total weight of the composition.

19. The water treatment composition of claim 18, wherein said calcium hypochlorite are particles having a diameter ranging from about 40 to about 5000 microns.

20. The water treatment composition of claim 19, wherein said calcium hypochlorite are particles having a diameter ranging from about 200 to about 5000 microns.

21. The water treatment composition of claim 18, wherein said additional ingredients are selected from the group consisting of copper sulfate, zinc sulfate, aluminum sulfate, sodium citrate, sodium borate, sodium tripolyphosphate (STPP), sodium hexametaphosphate (SHMP), 1,3-dichloro-S,S-dimethylhydantoin (DCDMH), 1,3-dibromo-S,S-dimethylhydrantoin (DBDMH), 1-bromo-3-chloro-S,S-dimethylhydantoin (BCDMH), 1,3-dichloro-5-ethyl-S-methylhydantoin (DCEMH), 1,3-dibromo-5-ethyl-S-methylhydantoin (DBEMH), 1-bromo-3-chloro-5-methyl-5-ethylhydrantoin (BCEMH), trichloro-, dichloro- and monochlorotriazine, sodium dichloro-s-triazinetrione dichloride, their hydrated form, and combinations thereof.

22. The water treatment composition of claim 18, wherein said calcium hypochlorite is substantially all anhydrous calcium hypochlorite.

23. The water treatment composition of claim 18, wherein said composition is formed into a tablet or briquette.

24. A dried water treatment composition exhibiting reduced chlorine loss during storage, comprising:
(a) an inner core layer comprising calcium hypochlorite, said calcium hypochlorite being at least 70 wt. % anhydrous calcium hypochlorite;
(b) one or more interlayers positioned on top of said inner core layer, said interlayer comprising one or more hydrated or anhydrous inorganic salts, hydrated or anhydrous organic salts, hydrated or anhydrous polymeric salts, alkaline metal hydroxides, alkaline earth hydroxides, and combinations thereof, said interlayer comprising from about 1% to about 5 wt % of the total weight of said dried composition; and
(c) an outer layer of magnesium sulfate tetrahydrate positioned on top of said interlayer(s); said outer layer comprising from about about 24 wt % to about 35 wt % of the total weight of said dried composition;
wherein said dried composition contains about 47 wt % to about 58 wt % available chlorine based on the total weight of said dried composition;
wherein said dried composition contains from about 9 wt % to about 11 wt % of hydrated water based on the total weight of said dried composition; and wherein said dried composition exhibits both reduced chlorine loss during storage and reduced oxidizing properties thereby qualifying as a non Division 5.1 oxidizer or as a NFPA Class 1 or NFPA Class 2 oxidizer; and
wherein said one or more outer layers further comprise one or more additional ingredients selected from the group consisting of water clarifiers, scale inhibitors, dispersants, water softeners, corrosion inhibitors, algaecides, fungicides, binders, and combinations thereof, and wherein said additional ingredients are present in an amount ranging from 0.1 to 5 wt %, based on the total weight of the composition.

25. The water treatment composition of claim 24, wherein said calcium hypochlorite are particles having a diameter ranging from about 40 to about 5000 microns.

26. The water treatment composition of claim 24, wherein said calcium hypochlorite are particles having a diameter ranging from about 200 to about 5000 microns.

27. The water treatment composition of claim 24, wherein said outer layer further comprises one or more additional agents selected from the group consisting of copper sulfate, zinc sulfate, aluminum sulfate, sodium citrate, sodium borate, sodium tripolyphosphate (STPP), sodium hexametaphosphate (SHMP), 1,3-dichloro-5,5-dimethylhydantoin (DCDMH), 1,3-dibromo-5,5-dimethylhydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-methyl-5-ethylhydrantoin (BCEMH), trichloro-, dichloro- and monochlorotriazine, sodium dichloro-striazinetrione dichloride, their hydrated form, and combinations thereof, and wherein said additional ingredients are present in an amount ranging from 0.1 to 5 wt %, based on the total weight of the coated composition.

28. The water treatment composition of claim 24, wherein said inorganic salt in said interlayer comprises alkali metal chlorides, alkali metal sulfates, alkali metal phosphates, alkali metal silicates, alkali metal borates, and combinations thereof.

29. The water treatment composition of claim 24, wherein interlayer is a salt selected from the group consisting of sodium chloride, sodium sulfate, sodium borate, sodium silicate, lithium hydroxide, calcium hydroxide, and combinations thereof.

30. The water treatment composition of claim 24, wherein said calcium hypochlorite is substantially all anhydrous calcium hypochlorite.

31. The water treatment composition of claim 24, wherein said composition is formed into a tablet or briquette.

32. A water treatment composition exhibiting reduced chlorine loss during storage, consisting essentially of:
- calcium hypochlorite coated with magnesium sulfate hydrate with an average hydrate number of about 4, said calcium hypochlorite being at least 70 wt. % anhydrous calcium hypochlorite,
- wherein said composition contains about 47 wt % to about 58 wt % available chlorine based on the total weight of said composition, and
- wherein said composition contains about 9 wt % to about 11 wt % of hydrated water based on the total weight of said dried composition,
- wherein said coating comprises from about 24 wt % to about 31 wt % of the total weight of said dried composition, and
- wherein said dried composition exhibits both reduced chlorine loss during storage and reduced oxidizing properties thereby qualifying as a non-Division 5.1 oxidizer or as a NFPA Class 1 or NFPA Class 2 oxidizer.

33. The water treatment composition of claim 32, wherein said calcium hypochlorite is substantially all anhydrous calcium hypochlorite.

34. The water treatment composition of claim 32, wherein said calcium hypochlorite are particles having a diameter ranging from about 200 to about 5000 microns.

35. The water treatment composition of claim 32, wherein said magnesium sulfate hydrate is magnesium sulfate tetrahydrate.

36. The water treatment composition of claim 32, wherein said composition is in the form of a tablet or briquette.

\* \* \* \* \*